(No Model.)

W. A. HOEVELER.
COUPLING FOR GAS PIPES.

No. 333,412. Patented Dec. 29, 1885.

Witnesses
A. A. Moore
E. B. Rankin.

William A. Hoeveler
Inventor
by
J. Connolly Bro

UNITED STATES PATENT OFFICE.

WILLIAM A. HOEVELER, OF PITTSBURG, PENNSYLVANIA.

COUPLING FOR GAS-PIPES.

SPECIFICATION forming part of Letters Patent No. 333,412, dated December 29, 1885.

Application filed November 3, 1885. Serial No. 181,766. (No model.)

*To all whom it may concern:*

Be it known that I, WILLIAM A. HOEVELER, a citizen of the United States, residing at Pittsburg, in the county of Allegheny and State of Pennsylvania, have invented certain new and useful Improvements in Couplings for Gas Pipes or Mains; and I do hereby declare the following to be a full, clear, and exact description of the invention, reference being had to the accompanying drawings, which form part of this specification.

This invention has relation to the means of coupling together the sections of gas-conduits when the same are made of cast-iron.

The object of this invention is to provide an expedient or expedients whereby the ends of the pipe-sections may be screw-threaded for the reception of a correspondingly-threaded coupling sleeve or collar.

This invention has for its further object the provision of novel means for packing or sealing the joints so as to render them gas-tight.

This invention has for its still further object the provision of means whereby a cast-metal sleeve may be provided with a screw-thread to fit the threads formed on the ends of the pipe-sections.

This invention consists, broadly, in applying to a cast-iron pipe-section or to a coupling-sleeve, or to both, a band or ring of steel or wrought or malleable iron for the reception of a screw-thread, said band being secured in place by shrinking or riveting.

My invention further consists in the novel means for packing the joint of a pipe-conduit, as hereinafter described.

Figure 1:
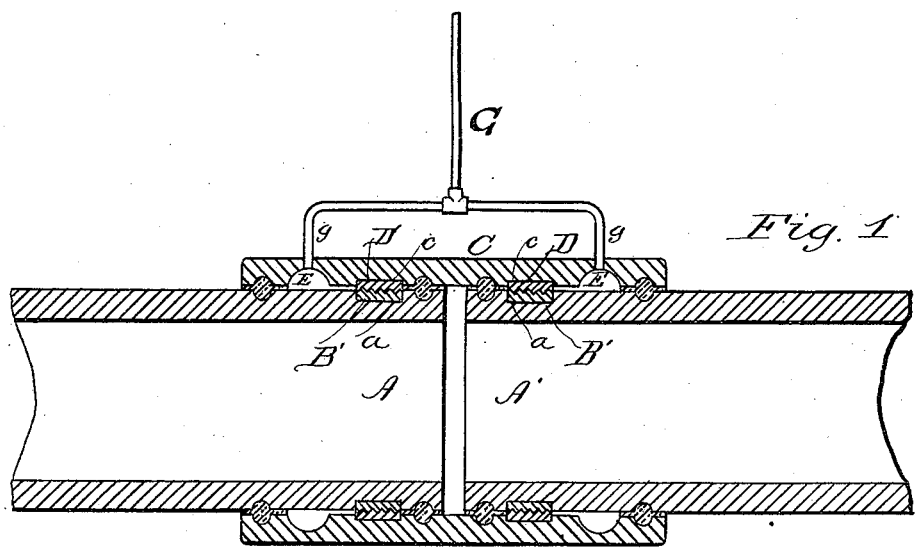
Figure 2:
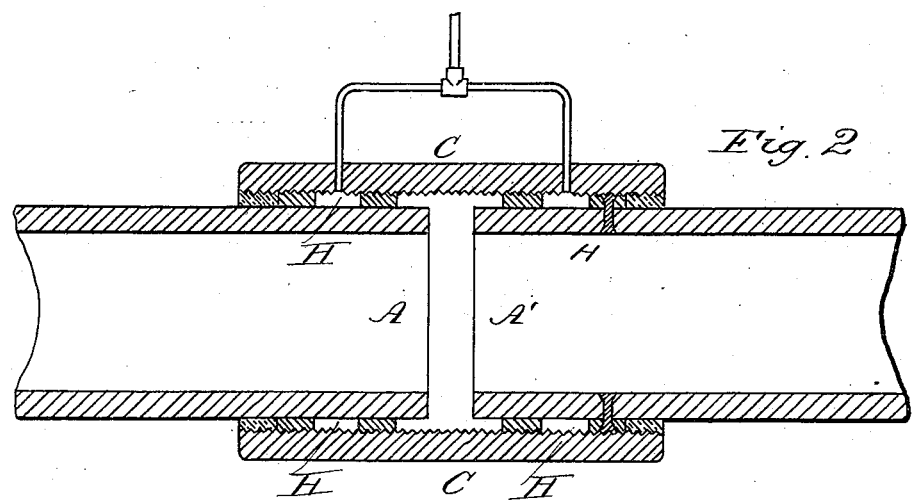

Referring to the accompanying drawings, wherein Figures 1 and 2 are longitudinal views of pipes coupled according to my invention, A A' designate the two sections of a conduit or gas-main having, as shown in Fig. 1, annular recesses or grooves *a a*, in which are shrunk the steel or wrought or malleable iron bands B' B', having screw-threads cut on their peripheries.

C designates a coupling-sleeve having bands or rings D' D' expanded into annular grooves *c c* and threaded on their inner surfaces to correspond with the threads on the bands B' B', with which they engage, as shown.

E E designate annular grooves formed on the inner surface of the sleeve between the threaded rings and the ends of the sleeve, and constituting chambers for the reception of leakage-gas, said chambers having outlets for the escape of said gas, and branches *g g* leading therefrom to a common escape-pipe, G. The outer surface of the pipe-sections A A' and the inner surface of the coupling-sleeve are correspondingly grooved on opposite sides of the threaded rings for the reception of lead or other sealing material, which is introduced in any suitable way and rendered close and tight by calking.

In Fig. 2 I have shown a modification wherein the threaded bands are applied only to the pipe-sections, and are either shrunk upon the surface thereof or riveted thereto at sufficient distance apart to leave shallow annular spaces or chambers H H for the reception of leakage-gas, said chambers being provided with suitable outlets or escape-pipes, as shown. The coupling-sleeve in this case is made of wrought or malleable iron, and is threaded throughout its entire length. The space between the screw-threaded bands and the ends of the sleeve may, if desired, be filled with lead or other suitable packing material.

Having fully described my invention, I claim—

1. In a conduit or main for the conveyance of gas, a cast-iron tube or conduit section having a band or bands of steel or wrought or malleable iron rigidly secured thereto and threaded upon its exterior surface, substantially as described.

2. In a conduit or pipe for the conveyance of gas, a tube or conduit section having a threaded band or ring shrunk thereon.

3. In a conduit or pipe for the conveyance of gas, a cast-iron pipe or section having its outer surface grooved, and having a threaded band or ring shrunk into or fastened within said groove, substantially as described.

4. A coupling-sleeve for gas pipes or conduits, consisting of a cylinder of cast-iron having a threaded band or ring applied to and secured within said sleeve, substantially as described.

5. In a conduit or pipe for the conveyance of gas, the combination, with adjacent sections of pipe, each section having screw-threaded rings secured thereto, of a screw-threaded sleeve adapted to fit over said rings, leaving a gas-receptive space between the rings, substantially as described.

In testimony that I claim the foregoing I have hereunto set my hand this 31st day of October, 1885.

WILLIAM A. HOEVELER.

Witnesses:
  THOS. A. CONNOLLY,
  C. L. STRAUB.